(12) United States Patent
Bonda et al.

(10) Patent No.: US 7,964,245 B2
(45) Date of Patent: Jun. 21, 2011

(54) UV-ABSORBING AND PHOTOSTABILIZING POLYMERS

(75) Inventors: Craig A. Bonda, Winfield, IL (US); Anna Pavlovic, Elmwood Park, IL (US); Jean Zhang, Hickory Hills, IL (US)

(73) Assignee: Hallstar Innovations Corp., Chicago, IL (US)

( * ) Notice: Subject to any disclaimer, the term of this patent is extended or adjusted under 35 U.S.C. 154(b) by 477 days.

(21) Appl. No.: 12/163,222

(22) Filed: Jun. 27, 2008

(65) Prior Publication Data
US 2009/0324835 A1 Dec. 31, 2009

(51) Int. Cl.
*B05D 3/00* (2006.01)
(52) U.S. Cl. .................................... 427/385.5
(58) Field of Classification Search .................. None
See application file for complete search history.

(56) References Cited

U.S. PATENT DOCUMENTS

| | | | |
|---|---|---|---|
| 3,215,724 A | 11/1965 | Strobel et al. | |
| 3,573,216 A | 3/1971 | Strobel et al. | |
| 3,644,466 A | 2/1972 | Strobel et al. | |
| 3,993,684 A | 11/1976 | Dunnavant et al. | |
| 4,178,303 A | 12/1979 | Lorenz et al. | |
| 4,202,834 A | 5/1980 | Gruber et al. | |
| 4,202,836 A | 5/1980 | Gruber et al. | |
| 4,203,919 A | 5/1980 | Gruber et al. | |
| 4,207,253 A | 6/1980 | Lorenz et al. | |
| 4,218,392 A | 8/1980 | Lorenz et al. | |
| 4,263,366 A * | 4/1981 | Lorenz et al. | 428/332 |
| 4,276,136 A * | 6/1981 | Gruber et al. | 522/77 |
| 4,307,240 A | 12/1981 | Ching | |
| 4,368,241 A | 1/1983 | Ching | |
| 4,562,278 A | 12/1985 | Hill | |
| 4,804,531 A | 2/1989 | Grollier | |

(Continued)

FOREIGN PATENT DOCUMENTS
WO WO-2005069822 A2 8/2005

OTHER PUBLICATIONS

International Preliminary Report on Patentability for corresponding International Application No. PCT/US2009/048572, dated Oct. 18, 2010.

(Continued)

*Primary Examiner* — Erma Cameron
(74) *Attorney, Agent, or Firm* — Marshall, Gerstein & Borun LLP

(57) ABSTRACT

Polymers comprising monomers having 2-cyano-3,3-diphenyl-prop-2-enoic acid moieties having the formula

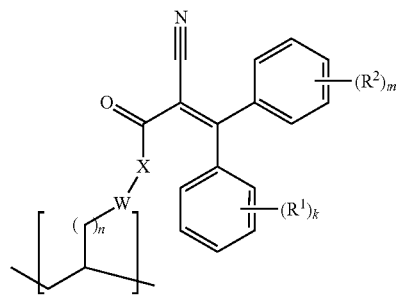

are disclosed. Compositions comprising said polymers and methods for increasing the UV-absorbing, water resistance, and photostabilizing properties of compositions comprising such polymers also are disclosed.

26 Claims, 1 Drawing Sheet

U.S. PATENT DOCUMENTS

| | | | |
|---|---|---|---|
| 5,240,982 A | 8/1993 | Farwaha et al. | |
| 5,306,485 A | 4/1994 | Robinson et al. | |
| 5,686,065 A | 11/1997 | Haney | |
| 5,783,173 A | 7/1998 | Bonda et al. | |
| 5,788,954 A | 8/1998 | Bonda et al. | |
| 5,827,509 A | 10/1998 | Richard et al. | |
| 5,849,273 A | 12/1998 | Bonda et al. | |
| 5,869,099 A | 2/1999 | Keller et al. | |
| 5,961,962 A | 10/1999 | Richard et al. | |
| 5,993,789 A | 11/1999 | Bonda et al. | |
| 6,113,931 A | 9/2000 | Bonda et al. | |
| 6,126,925 A | 10/2000 | Bonda et al. | |
| 6,126,948 A * | 10/2000 | Simonnet et al. | 424/401 |
| 6,129,909 A | 10/2000 | Bonda et al. | |
| 6,180,091 B1 | 1/2001 | Bonda et al. | |
| 6,210,658 B1 | 4/2001 | Bonda | |
| 6,284,916 B1 | 9/2001 | Bonda et al. | |
| 6,350,894 B1 | 2/2002 | Bonda et al. | |
| 6,355,261 B1 | 3/2002 | Bonda et al. | |
| 6,485,713 B1 | 11/2002 | Bonda et al. | |
| 6,518,451 B2 | 2/2003 | Bonda et al. | |
| 6,537,529 B1 | 3/2003 | Bonda | |
| 6,551,605 B2 | 4/2003 | Bonda | |
| 6,770,270 B2 | 8/2004 | Bonda | |
| 6,800,274 B2 | 10/2004 | Bonda et al. | |
| 6,890,521 B2 | 5/2005 | Bonda | |
| 6,899,866 B2 | 5/2005 | Bonda | |
| 6,919,473 B2 | 7/2005 | Bonda et al. | |
| 6,926,887 B2 | 8/2005 | Bonda et al. | |
| 6,962,692 B2 | 11/2005 | Bonda et al. | |
| 7,235,587 B2 | 6/2007 | Bonda et al. | |
| 7,276,230 B2 | 10/2007 | Gonzalez et al. | |
| 7,544,350 B2 | 6/2009 | Bonda et al. | |
| 7,550,134 B2 | 6/2009 | Bonda et al. | |
| 7,560,098 B2 | 7/2009 | Bonda et al. | |
| 7,588,702 B2 | 9/2009 | Bonda et al. | |
| 7,597,825 B2 | 10/2009 | Bonda et al. | |
| 7,648,697 B2 | 1/2010 | Bonda et al. | |
| 7,713,519 B2 | 5/2010 | Bonda et al. | |
| 7,754,191 B2 | 7/2010 | Bonda et al. | |
| 7,776,614 B2 | 8/2010 | Bonda | |
| 7,799,317 B2 | 9/2010 | Bonda et al. | |
| 2004/0047817 A1 | 3/2004 | Bonda | |
| 2005/0136012 A1 | 6/2005 | Gonzalez et al. | |
| 2005/0186152 A1 | 8/2005 | Bonda et al. | |
| 2005/0186153 A1 | 8/2005 | Bonda et al. | |
| 2005/0186154 A1 | 8/2005 | Bonda et al. | |
| 2005/0191249 A1 | 9/2005 | Bonda et al. | |
| 2006/0228311 A1 | 10/2006 | Bonda et al. | |
| 2008/0274304 A1 * | 11/2008 | Cherkaoui et al. | 428/1.2 |
| 2009/0039322 A1 | 2/2009 | Bonda et al. | |
| 2009/0069466 A1 | 3/2009 | Bonda et al. | |
| 2009/0208435 A1 | 8/2009 | Bonda et al. | |
| 2009/0246157 A1 | 10/2009 | Bonda et al. | |
| 2009/0291054 A1 | 11/2009 | Bonda et al. | |
| 2009/0291055 A1 | 11/2009 | Bonda et al. | |
| 2009/0291141 A1 | 11/2009 | Bonda et al. | |
| 2009/0324570 A1 | 12/2009 | Bonda et al. | |
| 2010/0021403 A1 | 1/2010 | Bonda et al. | |

OTHER PUBLICATIONS

International Search Report and Written Opinion for corresponding International Application No. PCT/US2009/048572, dated Oct. 26, 2009.

Senchenya et al., Silicon-containing ester of α-cyanoacrylic acid: synthesis and properties, *Russian Chemical Bulletin*, 42:909-11 (1993).

\* cited by examiner

UV-ABSORBING AND PHOTOSTABILIZING POLYMERS

BACKGROUND

1. Field of the Disclosure

The present disclosure is directed to polymers and to methods for increasing the UV-absorbance, water resistance, and/or photostability of a variety of compositions comprising the polymers. More particularly, the disclosure relates to polymers comprising 2-cyano-3,3-diphenyl-prop-2-enoic acid moieties, to compositions comprising said polymers, and to methods of using the same, for example, a method of protecting a material from ultra-violet radiation, a method of waterproofing, a method of forming a film, and a method of photostabilizing a photolabile compound.

2. Brief Description of Related Technology

Ultraviolet radiation (light) can cause various types of chronic and acute damage to human skin. Overexposure to ultraviolet light having a wavelength from about 280 nm or 290 nm to about 320 nm (UV-B) can produce sunburn, while chronic overexposure can lead to skin cancer and weakening of the immune system. UV-B radiation is capable of causing damage to DNA by chemically altering the DNA structure. Both UV-A radiation (about 320 nm to about 400 nm) and UV-B radiation can damage collagen fibers and vitamin A in the skin, leading to a reduction of skin elasticity and accelerated aging of the skin.

Ultraviolet radiation from the sun or artificial sources also can damage coatings containing photoactive substances, such as photoactive pigments and dyes, by altering chemical bonds in the structure of a component, such as a polymer, a pigment, or a dye. This photodegradation can lead to color fading, loss of gloss, and loss of physical and protective properties of a coating.

The inclusion of UV-absorbing and photostabilizing compounds in compositions such as sunscreens and coatings can serve to reducing the damaging effects of UV radiation. U.S. Pat. Nos. 4,202,836 and 4,263,366, for example, provide UV light absorbing compounds to reduce weathering of polymeric coatings.

SUMMARY

One aspect of the compounds, compositions, and methods described herein is to provide a polymeric compound having a crylene moiety (2-cyano-3,3-diphenyl-prop-2-enoic acid) attached to the polymer backbone. The crylene moiety can be attached to the polymer backbone by a saturated or unsaturated hydrocarbon linker. The crylene moiety also can be attached to the polymer backbone by a combination of a hydrocarbon linker and an additional linking group, such as an ester.

In another aspect, the polymers disclosed herein can be used to provide an ultraviolet (UV) light-absorbing, photostabilizing, and/or photoprotecting composition that includes a polymeric compound having a crylene moiety (2-cyano-3,3-diphenyl-prop-2-enoic acid) attached to the polymer backbone.

In another aspect, the polymers disclosed herein can be used to provide a sunscreen composition that includes a polymeric compound having a crylene moiety (2-cyano-3,3-diphenyl-prop-2-enoic acid) attached to the polymer backbone.

In another aspect, the polymers disclosed herein can be used to provide a waterproofing composition that includes a polymeric compound having a crylene moiety (2-cyano-3,3-diphenyl-prop-2-enoic acid) attached to the polymer backbone.

Another aspect of the compounds, compositions, and methods described herein is to provide a method of forming a UV-absorbing, photostabilizing, photoprotecting, and/or waterproofing film on a substrate surface by applying thereto a film or coating containing a polymeric compound having a crylene moiety (2-cyano-3,3-diphenyl-prop-2-enoic acid) attached to the polymer backbone.

Further aspects and advantages of the invention will be apparent to those skilled in the art from a review of the following detailed description, taken in conjunction with the appended claims. While the compounds, compositions, and methods are susceptible of embodiments in various forms, the description herein includes specific embodiments of the invention with the understanding that the disclosure is illustrative, and is not intended to limit the inventions to the specific embodiments described herein.

DETAILED DESCRIPTION

The present disclosure is directed to polymers comprising monomers having 2-cyano-3,3-diphenyl-prop-2-enoic acid moieties. Compositions comprising said polymers and methods for increasing the UV-absorbing, water resistance, and photostabilizing properties of compositions comprising such polymers also are disclosed.

The term "alkyl" as used herein refers to straight- and branched-chain hydrocarbon groups, preferably containing one to fifty carbon atoms, for example, one to thirty carbon atoms, one to twenty carbon atoms, and/or one to ten carbon atoms. Examples of alkyl groups are $C_1$-$C_4$ alkyl groups. As used herein the designation $C_u$-$C_v$, wherein u and v are integers, denotes a group having from u to v carbon atoms, e.g., a $C_1$-$C_4$ alkyl group is an alkyl group having one to four carbon atoms. Nonlimiting examples of alkyl groups include, methyl, ethyl, n-propyl, isopropyl, n-butyl, sec-butyl (2-methylpropyl), t-butyl (1,1-dimethylethyl), and 3,3-dimethylpentane.

The term "cycloalkyl" as used herein refers to an aliphatic cyclic hydrocarbon group, preferably containing three to ten carbon atoms, for example, three to six carbon atoms. Nonlimiting examples of cycloalkyl groups include cyclopropyl, cyclobutyl, cyclopentyl, and cyclohexyl.

The term "alkenyl" as used herein includes both straight-chained, branched, and cyclic hydrocarbon radicals that include at least one carbon-carbon double bond, preferably, an alkenyl group contains between two and fifty carbon atoms, for example, two to thirty carbon atoms, two to twenty carbon atoms, and/or two to ten carbon atoms. Nonlimiting examples of alkenyl groups include ethylene, propylene, isopropylene, and butylene.

The term "alkynyl" as used herein includes both straight- and branched-chain hydrocarbon radicals having at least one carbon-carbon triple bond. Preferably, an alkynyl group contains between two and fifty carbon atoms, for example, two to thirty carbon atoms, two to twenty carbon atoms, and/or two to ten carbon atoms.

The term "alkylene" as used herein refers to an alkyl group having a substituent. The alkylene group can be substituted with one or more substituents as disclosed herein.

The term "alkenylene" as used herein is defined identically as "alkylene," except the group contains at least one carbon-carbon double bond.

The term "alkynylene" as used herein is defined identically as "alkylene," except the group contains at least one carbon-carbon triple bond.

The term "polyether" as used herein refers to a group with at least two ethers present in a carbon chain. Nonlimiting examples of polyethers include 1-butoxy-2-methoxyethane, 1-butoxy-2-(2-methoxyethoxy)ethane, 2-(2-methoxyethoxy)-1-(2-methylpentyloxy)propane, and 1-(2-methylpentyloxy)-2-(2-pentyloxyethoxy)propane.

The terms "substituted alkyl," "substituted cycloalkyl," "substituted alkenyl," "substituted alkynyl," "substituted alkylene," "substituted alkenylene," "substituted alkynylene," "substituted polyether," "substituted aryl," "substituted heteroaryl," "substituted heterocycloalkyl," and "substituted heterocyclic ring" as used herein refer to an alkyl, cycloalkyl, alkenyl, alkynyl, polyether, aryl, heteroaryl, heterocycloalkyl, or heterocyclic ring group having one or more substituents. Substituents can include, but are not limited to, alkyl, cycloalkyl, alkenyl, alkynyl, polyether, substituted polyether, aryl, substituted aryl, heteroaryl, substituted heteroaryl, heterocycloalkyl, substituted heterocycloalkyl, hydroxyl, oxy (or oxo), alkoxy, ester, thioester, acyl, carboxy, cyano, nitro, amino, amido, sulfur, and halo. Substituted alkyl, cycloalkyl, alkenyl, alkynyl, polyether, aryl, heteroaryl, or heterocycloalkyl groups can be mono-substituted, or can have more than one substituent. The substituents can be bound to the same carbon or two or more different carbon atoms.

The term "alkoxy" as used herein refers to a group of the general formula —OR, wherein R is an alkyl group, alkenyl group, alkynyl group, cycloalkyl group, polyether, aryl, substituted alkyl group, substituted alkenyl group, substituted alkynyl group, substituted cycloalkyl group, substituted aryl group, substituted heteroaryl group, substituted heterocycloalkyl group, or substituted polyether group.

The term "ester" as used herein refers to a group of the general formula —OC(O)R or —C(O)OR, wherein R is an alkyl group, alkenyl group, alkynyl group, cycloalkyl group, polyether, aryl, substituted alkyl group, substituted alkenyl group, substituted alkynyl group, substituted cycloalkyl group, substituted aryl group, substituted heteroaryl group, substituted heterocycloalkyl group, or substituted polyether group.

The term "thioester" as used herein refers to a group of the general formula —SC(O)R or —C(O)SR, wherein R is an alkyl group, alkenyl group, alkynyl group, cycloalkyl group, polyether, aryl, substituted alkyl group, substituted alkenyl group, substituted alkynyl group, substituted cycloalkyl group, substituted aryl group, substituted heteroaryl group, substituted heterocycloalkyl group, or substituted polyether group.

The term "acyl" as used herein refers to a group of the general formula —C(O)R, wherein R is an alkyl group, alkenyl group, alkynyl group, cycloalkyl group, polyether, aryl, substituted alkyl group, substituted alkenyl group, substituted alkynyl group, substituted cycloalkyl group, substituted aryl group, substituted heteroaryl group, substituted heterocycloalkyl group, or substituted polyether group.

The term "aryl" as used herein refers to cyclic (e.g., monocyclic, fused bicyclic, and fused tricyclic) carbocyclic aromatic ring systems including, but not limited to, phenyl, naphthyl, tetrahydronaphthyl, phenanthrenyl, biphenylenyl, indanyl, indenyl, anthracenyl, and fluorenyl.

The term "heteroaryl" as used herein refers to cyclic (e.g., monocyclic, fused bicyclic, and fused tricyclic) aromatic ring systems, wherein preferably one to four-ring atoms are selected from the group consisting of oxygen, nitrogen, and sulfur, and the remaining ring atoms are carbon, said ring system being joined to the remainder of the molecule by any of the ring atoms. Nonlimiting examples of heteroaryl groups include, but are not limited to, pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, thiophenyl, furanyl, quinolinyl, isoquinolinyl, benzoxazolyl, benzimidazolyl, and benzothiazolyl.

The terms "heterocycloalkyl" or "heterocyclic ring" as used herein refer to an aliphatic, partially unsaturated or fully saturated, preferably 3- to 14-membered ring system, including, for example, single rings of 3 to 8 atoms and bi- and tricyclic ring systems. The heterocycloalkyl ring systems include preferably one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl. Representative substituted heterocyclic rings include, but are not limited to, maleic anhydride, 2,3-dimethylmaleic anhydride, hydromuconic anhydride, and maleimide.

The term "amino" as used herein refers to an —NH$_2$, —NH—, or group, wherein each hydrogen in each formula can be replaced with an alkyl, cycloalkyl, aryl, polyether, heteroaryl, heterocycloalkyl, substituted alkyl, substituted cycloalkyl, substituted aryl, substituted polyether, substituted heteroaryl, or substituted heterocycloalkyl group, e.g., —N(R)$_2$. In the case of —NH$_2$, the hydrogen atoms also can be replaced with substituents taken together to form a 5- or 6-membered aromatic or non-aromatic ring, wherein one or two carbons of the ring optionally are replaced with a heteroatom selected from the group consisting of sulfur, oxygen, and nitrogen. The ring also optionally can be substituted with an alkyl group. Examples of rings formed by substituents taken together with the nitrogen atom include morpholinyl, piperazinyl, imidazolyl, pyrrolidinyl, (N-methyl)piperazinyl, and piperidinyl.

The term "amido" as used herein refers to a moiety of the general formula —C(O)NR'R" wherein R' and R" are the same or different and selected from hydrogen, alkyl, alkenyl, alkynyl, substituted alkyl, substituted alkenyl, substituted alkynyl, aryl, substituted aryl, heteroaryl, and substituted heteroaryl.

The term "cyano" as used herein refers to a —C≡N group, also designated —CN.

The term "nitro" as used herein refers to a —NO$_2$ group.

The term "halo" as used herein includes fluorine, chlorine, bromine, and iodine.

The term "carboxy" as used herein refers to a moiety of the general formula —C(O)OH.

The term "sulfur" as used herein refers to a neutral sulfur atom that is unsubstituted or substituted with one or more of a neutral species, including any oxidized or reduced form of sulfur (e.g., —SO$_2$—). Nonlimiting examples of sulfur groups include sulfites, sulfides, sulfates, and alkyl sulfides.

The term "hydroxyl" as used herein refers to an —OH group.

The term "oxo" or "oxy" as used herein refers to an =O group.

The terms "waterproof" and "waterproofing" as used herein refers to any increase in a material/surface's ability to repel water from permeating the material/surface. These terms are not intended to mean that a material/surface is completely impervious to water, rather, the terms "waterproof" and "waterproofing" are intended to be understood as making a material/surface less water permeable relative to the material/surface not having been "waterproofed" or not having undergone "waterproofing."

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

One embodiment of the compounds, compositions, and methods described herein is a polymer comprising a monomer having a formula (I):

(I)

wherein:
R$^1$ and R$^2$ are each independently selected from the group consisting of C$_1$-C$_{50}$ alkyl, C$_2$-C$_{50}$ alkenyl, C$_2$-C$_{50}$ alkynyl, C$_3$-C$_8$ cycloalkyl, C$_2$-C$_{50}$ polyether, C$_2$-C$_{50}$ substituted polyether, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, halo, —C(O)OR$^a$, —OC(O)R$^a$, —C(O)H, —C(O)R$^a$, —C(O)NR$^a$R$^b$, —C(O)SR$^a$, —OR$^a$, —SR$^a$, —NR$^a$R$^b$, —CN, and —NO$_2$;
X is O, S, or NR$^c$;
W is —C(O)OR$^z$—, —C(O)R$^z$—, —C(O)NR$^d$R$^z$—, —C(O)SR$^z$—, —SR$^z$—, —NR$^e$R$^z$—, or a bond;
n is 3 to 30;
k and m are each independently selected from 0 to 5;
R$^a$, R$^b$, R$^c$, R$^d$, and R$^e$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl; and
R$^z$ is C$_1$-C$_{50}$ alkylene, C$_2$-C$_{50}$ alkenylene, C$_2$-C$_{50}$ alkynylene, C$_3$-C$_8$ cycloalkyl, C$_1$-C$_{50}$ substituted alkylene, C$_2$-C$_{50}$ substituted alkenylene, C$_2$-C$_{50}$ substituted alkynylene, C$_3$-C$_8$ substituted cycloalkyl, aryl, substituted aryl, heteroaryl, substituted heteroaryl, heterocycloalkyl, or substituted heterocycloalkyl;
with the proviso that when W is —C(O)OR$^z$—, n is 8 to 30.

In one embodiment, n is 8 to 13. For example, n can be 9 to 12, and/or 10 to 11.

In one embodiment, W can be represented by the formula (VII):

(VII)

In another embodiment, X can be O.

In a preferred embodiment, k and m are 0 or 1, R$^1$ and R$^2$ are the same or different, and R$^1$ and R$^2$ both are —OR$^a$, wherein R$^a$ is as defined above for formula (I).

In one embodiment, k and m both are 1, R$^1$ and R$^2$ are the same or different, and R$^1$ and R$^2$ both are —OR$^a$, wherein R$^a$ is as defined above for formula (I).

In another embodiment, k is 1, m is 0, and R$^1$ is —OR$^a$, wherein R$^a$ is as defined above for formula (I). In one embodiment, R$^a$ is C$_1$-C$_3$ alkyl. In another embodiment, R$^1$ is —OCH$_3$. In another embodiment, R$^1$ is -para-OCH$_3$.

In one embodiment, k is 0, m is 1, and R$^2$ is —OR$^a$. In one embodiment, R$^a$ is C$_1$-C$_3$ alkyl. In another embodiment, R$^2$ is —OCH$_3$. In another embodiment, R$^2$ is -para-OCH$_3$.

In one embodiment, k and m are both 0.

In a preferred embodiment, the polymer comprises a monomer having a formula (VIII):

(VIII)

wherein:
k is 0 or 1; and
R$^1$ is —OR$^a$, wherein R$^a$ is as defined above for formula (I), preferably wherein R$^a$ is C$_1$-C$_3$ alkyl.

In another embodiment, the polymer comprises a monomer having a formula (IX):

(IX)

wherein:

k is 0 or 1; and

R$^1$ is —OR$^a$, wherein R$^a$ is as defined above for formula (I), preferably wherein R$^a$ is C$_1$-C$_3$ alkyl.

Exemplary monomers include, but are not limited to, 2-propenoic acid 2-cyano-3,3-diphenyl-12-tridecen-1-yl ester, 2-propenoic acid 2-cyano-3,3-diphenyl-11-dodecen-1-yl ester, 2-propenoic acid 2-cyano-3,3-diphenyl-10-undecen-1-yl ester, 2-propenoic acid 2-cyano-3,3-diphenyl-9-decen-1-yl ester, 2-propenoic acid 2-cyano-3,3-diphenyl-8-nonen-1-yl ester, and 2-propenoic acid 2-cyano-3,3-diphenyl-7-octen-1-yl ester. Additional exemplary monomers include, but are not limited to, both the E and Z isomers of 2-propenoic acid 2-cyano-3-(4-methoxyphenyl)-3-phenyl-12-tridecen-1-yl ester, 2-propenoic acid 2-cyano-3-(4-methoxyphenyl)-3-phenyl-11-dodecen-1-yl ester, 2-propenoic acid 2-cyano-3-(4-methoxyphenyl)-3-phenyl-10-undecen-1-yl ester, 2-propenoic acid 2-cyano-3-(4-methoxyphenyl)-3-phenyl-9-decen-1-yl ester, 2-propenoic acid 2-cyano-3-(4-methoxyphenyl)-3-phenyl-8-nonen-1-yl ester, and 2-propenoic acid 2-cyano-3-(4-methoxyphenyl)-3-phenyl-7-octen-1-yl ester.

The polymer of the present disclosure can further comprise one or more monomers having a formula (II):

(II)

wherein:

R$^3$ and R$^5$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, and halo; and

R$^4$ and R$^6$ are each independently selected from the group consisting of hydrogen, fluoride, chloride, iodide, C$_1$-C$_{50}$ alkyl, C$_2$-C$_{50}$ alkenyl, C$_2$-C$_{50}$ alkynyl, C$_3$-C$_8$ cycloalkyl, C$_2$-C$_{50}$ polyether, C$_2$-C$_{50}$ substituted polyether, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, halo, —C(O)OR$^x$, —OC(O)R$^x$, —C(O)H, —C(O)R$^x$, —C(O)NR$^x$R$^y$, —C(O)SR$^x$, —OR$^x$, —SR$^x$, —NR$^x$R$^y$, —CN, and —NO$_2$; or R$^4$ and R$^6$ taken together with the atoms to which they are bonded form a 5 to 7 membered heterocyclic ring or a substituted 5 to 7 membered heterocyclic ring; and

R$^x$ and R$^y$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl.

The polymer of the present disclosure also can comprise a monomer having a formula (III), (IIIA), (IV), (V), or (VI):

(III)

(IIIA)

(IV)

(V)

(VI)

wherein:

X$^1$, X$^2$, X$^3$, X$^4$, and X$^5$ are each independently selected from the group consisting of O, S, and NR$^f$; and R$^7$, R$^8$, R$^9$, R$^{10}$, R$^{11}$, R$^{13}$, and R$^f$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl, or R$^{10}$ and R$^f$ taken together with the atoms to which they are bonded form a 5 or 6 membered ring.

Suitable monomers for use in the present invention include, but are not limited to, maleic anhydride monomers, methyl methacrylate monomers, vinyl acetate monomers, C$_3$-C$_{38}$ alpha-olefin monomers, N-vinyl pyrrolidone monomers, styrene monomers, and combinations of the foregoing monomers. Exemplary monomers include, but are not limited to, maleic anhydride, 2,3-dimethyl maleic anhydride, maleimide, acrylic acid, methacrylic acid, methyl acrylate, methyl methacrylate, acrylamide, N,N-dimethylacrylamide, methacrylamide, N,N-dimethylmethacrylamide, vinyl acetate, vinyl chloride, 1-octene, 1-nonene, 1-decene, 1-undecene, 1-dodecene, 1-tridecene, 1-tetradecene, 1-pentadecene, 1-hexadecene, 1-pentadecene, 1-heptadecene, 1-octadecene, N-vinyl pyrrolidone, and styrene.

In accordance with the present disclosure, the polymers can comprise a combination of one or more of the foregoing monomers. Exemplary polymers include, but are not limited to, copolymers of maleic anhydride, (Z)-2-propenoic acid 2-cyano-3-(4-methoxyphenyl)-3-phenyl-10-undecen-1-yl ester, and 1-dodecene; and copolymers of maleic anhydride, (Z)-2-propenoic acid 2-cyano-3-(4-methoxyphenyl)-3-phenyl-10-undecen-1-yl ester, and 1-dodecene.

The polymer molecules comprising a particular polymer generally exist as a mixture of polymer molecules having different chain lengths. The polymer generally is described as having a chain length that is an average of the chain lengths of the various polymer molecules. Likewise, the molecular weight of a particular polymer can be determined in a number of ways, including a determination of the weight average molecular weight ($M_W$), which is the summation of the weights of each different sized polymer in a mixture multiplied by the mole fraction of that polymer size in the polymer mixture. Nonlimiting examples of methods for calculating a given polymer's weight average molecular weight include diffusion, sedimentation, flow birefringence, and light scattering. Preferably, a polymer described herein has a weight average molecular weight is the range of about 1,000 to about 1,000,000 grams/mole, more preferably in the range of about 2,000 to about 130,000 grams/mole, even more preferably in the range of about 3,000 to about 110,000 grams/mole.

The polymers disclosed herein can be used to provide compositions having UV-absorbing, photostabilizing, photoprotecting, and/or waterproofing properties. For example, the polymers can be used, optionally together with other photoactive compounds, to provide photoactive compositions, such as sunscreen compositions. Examples of such sunscreen compositions include UV-absorbing and photostabilizing sunscreens capable of photostabilizing photoactive compounds, such as the photoactive compounds described in U.S. Patent Application Publication Nos. 2005/0186152, 2005/0186153, 2005/0186154, 2005/0191249 which are hereby incorporated by reference.

A photoactive compound can be considered stable when, for example, after 30 MED (minimal erythema dose) irradiation the photoactive compound has retained at least about 90% of its original absorbance at a wavelength, or over a range of wavelengths of interest (e.g., the wavelength at which a photoactive compound has a peak absorbance, such as 350-370 nm for avobenzone). Likewise, a sunscreen composition can include a plurality of photoactive compounds and a sunscreen composition, as a whole, can be considered stable when, for example, after 30 MED irradiation the sunscreen composition has retained at least about 90% of its original absorbance at one or more wavelengths of interest (e.g., at or near the peak absorbance wavelength of the primary photoactive compound).

Photoactive compositions, e.g., sunscreen compositions, generally include UV-A and UV-B photoactive compounds in a cosmetically acceptable carrier, optionally including additives, such as emollients, stabilizers, emulsifiers, and combinations thereof. These additives can be used in preparing a UV filter composition in an emulsion (oil-in-water or water-in-oil) from a composition that includes one or more photoactive compounds and a solvent or a solvent combination that includes one or more organic solvents and water. When made, preferably the emulsion is an oil-in-water emulsion, wherein the oil phase is primarily formed from a mixture of the UV filter compound(s) and one or more organic solvents.

A photoactive compound is one that responds to light photoelectrically. In the compositions and methods of photostabilization disclosed herein, a photoactive compound is one that responds to UV radiation photoelectrically. For example, photoactive compound-containing compositions that respond to UV radiation photoelectrically by photoactive compound photodegradation can benefit by the inclusion of the crylene molecules described herein. The crylenes described herein can be useful photostabilizers and/or photoactive compounds when combined with any single or combination photoactive compounds identified in Shaath, Nadim, Encyclopedia of UV filters, © 2007, hereby incorporated by reference. Photostability is a problem with all UV filters because they all reach an electronic singlet excited state upon exposure to UV radiation.

It is theorized that the following UV filters are photostabilized by the crylene molecules described herein, including all of the following, including combinations of any two or more, and including compounds selected from the following categories (with specific examples) including: p-aminobenzoic acid, its salts and its derivatives (ethyl, isobutyl, glyceryl esters; p-dimethylaminobenzoic acid); anthranilates (o-aminobenzoates; methyl, menthyl, phenyl, benzyl, phenylethyl, linalyl, terpinyl, and cyclohexenyl esters); salicylates (octyl, amyl, phenyl, benzyl, menthyl (homosalate), glyceryl, and dipropyleneglycol esters); cinnamic acid derivatives (menthyl and benzyl esters, alpha-phenyl cinnamonitrile; butyl cinnamoyl pyruvate); dihydroxycinnamic acid derivatives (umbelliferone, methylumbelliferone, methylaceto-umbelliferone); camphor derivatives (3 benzylidene, 4 methylbenzylidene, polyacrylamidomethyl benzylidene, benzalkonium methosulfate, benzylidene camphor sulfonic acid, and terephthalylidene dicamphor sulfonic acid); trihydroxycinnamic acid derivatives (esculetin, methylesculetin, daphnetin, and the glucosides, esculin and daphnin); hydrocarbons (diphenylbutadiene, stilbene); dibenzalacetone; benzalacetophenone; naphtholsulfonates (sodium salts of 2-naphthol-3,6-disulfonic and of 2-naphthol-6,8-disulfonic acids); dihydroxy-naphthoic acid and its salts; o- and p-hydroxydiphenyldisulfonates; coumarin derivatives (7-hydroxy, 7-methyl, 3-phenyl); diazoles (2-acetyl-3-bromoindazole, phenyl benzoxazole, methyl naphthoxazole, various aryl benzothiazoles); quinine salts (bisulfate, sulfate, chloride, oleate, and tannate); quinoline derivatives (8-hydroxyquinoline salts, 2-phenylquinoline); hydroxy- or methoxy-substituted benzophenones; uric acid derivatives; vilouric acid derivatives; tannic acid and its derivatives; hydroquinone; and benzophenones (oxybenzone, sulisobenzone, dioxybenzone, benzoresorcinol, octabenzone, 4-isopropyldibenzoylmethane, butylmethoxydibenzoylmethane, etocrylene, and 4-isopropyl-dibenzoylmethane).

The following UV filters should be particularly photostabilized by the crylene molecules described herein: 2-ethylhexyl p-methoxycinnamate (octyl methoxycinnamate), 4-tert-butyl-4'-methoxydibenzoylmethane (4-(1,1-dimethylethyl)-4'-methoxydibenzoylmethane), octyldimethyl p-aminobenzoate, digalloyltrioleate, ethyl 4-[bis(hydroxypropyl)] aminobenzoate, 2-ethylhexylsalicylate, glycerol p-aminobenzoate, 3,3,5-trimethylcyclohexylsalicylate, and combinations thereof.

Photoactive compositions disclosed herein can include a variety of photoactive compounds, preferably including one or more UV-A photoactive compounds and one or more UV-B photoactive compounds. Preferably, a sunscreen composition includes a photoactive compound selected from the group consisting of p-aminobenzoic acid and salts and derivatives thereof; anthranilate and derivatives thereof; dibenzoylmethane and derivatives thereof; salicylate and derivatives thereof; cinnamic acid and derivatives thereof; dihydroxycinnamic acid and derivatives thereof; camphor and salts and derivatives thereof; trihydroxycinnamic acid and derivatives thereof; dibenzalacetone naphtholsulfonate and salts and derivatives thereof; benzalacetophenone naphtholsulfonate and salts and derivatives thereof; dihydroxy-naphthoic acid and salts thereof; o-hydroxydiphenyldisulfonate and salts and derivatives thereof; p-hydroxydiphenyldisulfonate and salts and derivatives thereof; coumarin and derivatives thereof; diazole derivatives; quinine derivatives and salts thereof; quinoline derivatives; uric acid derivatives; vilouric acid derivatives; tannic acid and derivatives thereof; hydroquinone; diethylamino hydroxybenzoyl hexyl benzoate and salts and derivatives thereof; and combinations of the foregoing.

UV A radiation (about 320 nm to about 400 nm), is recognized as contributing to causing damage to skin, particularly to very lightly colored or sensitive skin. A sunscreen composition disclosed herein preferably includes a UV-A photoactive compound. Preferably, a sunscreen composition disclosed herein includes a dibenzoylmethane derivative UV-A photoactive compound. Preferred dibenzoylmethane derivatives include, 2-methyldibenzoylmethane; 4-methyldibenzoylmethane; 4-isopropyldibenzoylmethane; 4-tert-butyldibenzoylmethane; 2,4-dimethyldibenzoylmethane; 2,5-dimethyldibenzoylmethane; 4,4'-diisopropyldibenzoylmethane; 4,4'-dimethoxydibenzoylmethane; 4-tert-butyl-4'-methoxydibenzoylmethane; 2-methyl-5-isopropyl-4'-methoxydibenzoylmethane; 2-methyl-5-tert-butyl-4'-methoxydibenzoylmethane; 2,4-dimethyl-4'-methoxydibenzoylmethane; 2,6-dimethyl-4-tert-butyl-4'-methoxydibenzoylmethane, and combinations thereof.

For a product marketed in the United States, preferred cosmetically acceptable photoactive compounds and concentrations (reported as a percentage by weight of the total cosmetic sunscreen composition) include: aminobenzoic acid (also called para aminobenzoic acid and PABA; 15% or less), Avobenzone (also called butyl methoxy dibenzoylmethane; 3% or less), cinoxate (also called 2 ethoxyethyl p methoxycinnamate; 3% or less), dioxybenzone (also called benzophenone 8; 3% or less), homosalate (also called 3,3,5-trimethylcyclohexyl salicylate, 15% or less), menthyl anthranilate (also called menthyl 2 aminobenzoate; 5% or less), octocrylene (also called 2 ethylhexyl 2 cyano 3,3 diphenylacrylate; 10% or less), octyl methoxycinnamate (7.5% or less), octyl salicylate (also called 2 ethylhexyl salicylate; 5% or less), oxybenzone (also called benzophenone 3; 6% or less), padimate O (also called octyl dimethyl PABA; 8% or less), phenylbenzimidazole sulfonic acid (water soluble; 4% or less), sulisobenzone (also called benzophenone 4; 10% or less), titanium dioxide (25% or less), trolamine salicylate (also called triethanolamine salicylate; 12% or less), and zinc oxide (25% or less).

Other preferred cosmetically acceptable photoactive compounds and preferred concentrations (percent by weight of the total cosmetic sunscreen composition) include diethanolamine methoxycinnamate (10% or less), ethyl-[bis(hydroxypropyl)] aminobenzoate (5% or less), glyceryl aminobenzoate (3% or less), 4 isopropyl dibenzoylmethane (5% or less), 4 methylbenzylidene camphor (6% or less), terephthalylidene dicamphor sulfonic acid (10% or less), and sulisobenzone (also called benzophenone 4, 10% or less).

For a product marketed in the European Union, preferred cosmetically acceptable photoactive compounds and preferred concentrations (reported as a percentage by weight of the total cosmetic sunscreen composition) include: PABA (5% or less), camphor benzalkonium methosulfate (6% or less), homosalate (10% or less), benzophenone 3 (10% or less), phenylbenzimidazole sulfonic acid (8% or less, expressed as acid), terephthalidene dicamphor sulfonic acid (10% or less, expressed as acid), butyl methoxydibenzoylmethane (5% or less), benzylidene camphor sulfonic acid (6% or less, expressed as acid), octocrylene (10% or less, expressed as acid), polyacrylamidomethyl benzylidene camphor (6% or less), ethylhexyl methoxycinnamate (10% or less), PEG 25 PABA (10% or less), isoamyl p methoxycinnamate (10% or less), ethylhexyl triazone (5% or less), drometrizole trielloxane (15% or less), diethylhexyl butamido triazone (10% or less), 4 methylbenzylidene camphor (4% or less), 3 benzylidene camphor (2% or less), ethylhexyl salicylate (5% or less), ethylhexyl dimethyl PABA (8% or less), benzophenone 4 (5%, expressed as acid), methylene bis benztriazolyl tetramethylbutylphenol (10% or less), disodium phenyl dibenzimidazole tetrasulfonate (10% or less, expressed as acid), bis ethylhexyloxyphenol methoxyphenol triazine (10% or less), methylene bisbenzotriazolyl tetramethylbutylphenol (10% or less, also called TINOSORB M or Bisoctrizole), and bisethylhexyloxyphenol methoxyphenyl triazine.(10% or less, also called TINOSORB S or Bemotrizinol).

In one embodiment of the present disclosure, a UV-absorbing composition comprises any one of the polymers provided herein, a dibenzoylmethane derivative, and a cinnamate ester. In another embodiment, the UV-absorbing composition comprises any one of the polymers provided herein, avobenzone, and octyl methoxycinnamate (OMC). Avobenzone is also called 4-(1,1-dimethylethyl)-4'-methoxydibenzoylmethane and is sold under the brand name PARSOL 1789.

The polymers disclosed herein also can be used to provide waterproofing compositions. The ability of a material or surface to repel water from permeating the material or surface can be increased by forming a film comprising the polymer on the material or surface.

The polymers disclosed herein can be formed into films on materials or surfaces. In accordance with the disclosed methods, a UV-absorbing film can be formed on a material or surface by providing a solution comprising the polymer and an organic solvent, applying the solution to a surface, and removing the solvent. Various organic solvents can be used to form the solution comprising the polymer. Suitable organic solvents include, but are not limited to, acetone, ethyl acetate, methylene chloride, and isopropanol. The solution can be applied to the material or surface by various means, for example, by pipeting, spraying, dipping, spreading, or pouring. The solvent typically is removed by allowing the solvent to evaporate at room temperature, but the solvent also can be removed in other ways, for example, by heating or subjecting to vacuum pressure.

The polymers disclosed herein also can be used to waterproof materials or surfaces. In accordance with the disclosed methods, a surface can be waterproofed by providing a solution comprising the polymer and an organic solvent, applying the solution to a surface, and removing the solvent.

EXAMPLES

The following examples are provided to illustrate the compounds, compositions, and methods described herein but are not intended to limit the scope of the compounds, compositions, and methods described herein.

Example 1

The following is a preparation for a polyolefin-polyanhydride copolymer compound containing crylene moieties and alkyl groups (a $C_{10}$ straight-chain hydrocarbon) attached to the polymer backbone. Maleic anhydride served as the anhydride monomer (formula (1)), 2-propenoic acid 2-cyano-3,3-diphenyl-10-undecen-1-yl ester served as the crylene moiety monomer (formula (2)), and 1-dodecene served as the alkyl group monomer (formula (3)). Thus, the polymer produced by the foregoing procedure included the following monomer units:

It is also expected that a small amount (e.g., 0.1 wt. % to 10 wt. %) of the unreacted maleic anhydride, unreacted 2-propenoic acid 2-cyano-3,3-diphenyl-10-undecen-1-yl ester, and/or unreacted 1-dodecene can be present in the final polymer composition.

To prepare the polymer, a 4-neck round bottom flask equipped with a mechanical stirrer and addition funnels was charged with 1-dodecene (0.5 mole) and 2-propenoic acid 2-cyano-3,3-diphenyl-10-undecen-1-yl ester (0.45 mole). After heating the mixture to 160° C.-170° C., a solution of maleic anhydride (1.1 mole) and tert-butyl peroxide (0.04 mole) was added dropwise over 1 hour. After the addition was complete, the reaction was then stirred for an additional 1 hour while maintaining the temperature at 160° C.-170° C. to yield the final copolymer product.

After cooling, the reaction product thus prepared can be flaked, powdered, or formed into a film. To prepare a film on a surface, a 10% (w/v) solution of powdered polymer in ethyl acetate was applied to the surface. The solution was spread to cover the desired area of the surface and allowed to dry. The resultant polymer-containing film was clear and glossy in appearance and demonstrated strong adherence to a variety of materials including polystyrene, polypropylene, glass, high density polyethylene (HDPE), steel, aluminum, epoxy resins, and poly(vinyl chloride). The film was smooth and had a non-tacky surface. When the film was formed on a non-rigid surface, the flexibility of the film could be assessed and the film was observed to be highly flexible. Additionally, the films prepared in accordance with the methods disclosed herein were UV-absorbing, light-stabilizing, and waterproof.

Example 2

The following is a preparation for a polyolefin-polyanhydride copolymer compound containing crylene moieties and alkyl groups (a $C_{10}$ straight-chain hydrocarbon) attached to the polymer backbone. Maleic anhydride served as the anhydride monomer (formula (1)), (Z)-2-propenoic acid 2-cyano-3-(4-methoxyphenyl)-3-phenyl-10-undecen-1-yl ester served as the crylene moiety monomer (formula (4)), and 1-dodecene served as the alkyl group monomer (formula (3)). Thus, the polymer produced by the foregoing procedure included the following monomer units:

It is also expected that a small amount (e.g., 0.1 wt. % to 10 wt. %) of the unreacted maleic anhydride, unreacted (Z)-2-propenoic acid 2-cyano-3-(4-methoxyphenyl)-3-phenyl-10-undecen-1-yl ester, and/or unreacted 1-dodecene can be present in the final polymer composition.

To prepare the polymer, a 4-neck round bottom flask equipped with a mechanical stirrer and addition funnels was charged with 1-dodecene (0.5 mole) and (Z)-2-propenoic acid 2-cyano-3-(4-methoxyphenyl)-3-phenyl-10-undecen-1-yl ester (0.45 mole). After heating the mixture to 160° C.-170° C., a solution of maleic anhydride (1.1 mole) and tert-butyl peroxide (0.04 mole) was added dropwise over 1 hour. After the addition was complete, the reaction was then stirred for an additional 1 hour while maintaining the temperature at 160° C.-170° C. to yield the final copolymer product.

After cooling, the reaction product thus prepared can be flaked, powdered, or formed into a film as described in Example 1.

Example 3

The following is a preparation for films containing the polymers described in Examples 1 and 2. After forming the films on polymethylmethacrylate (PMMA) plates, the UV absorbance of the films was measured. PMMA plates were used as substrates for the films due to the relatively high UV transparency of PMMA.

To prepare the films, 1 gram of the powdered polymer of Example 1 or Example 2 was dissolved in 9 grams of ethyl acetate. A film prepared from a polymer that did not contain crylene moieties served as a control. To prepare the control film, 1 gram of PA-18 copolymer (a copolymer of maleic anhydride and 1-octadecene, available from Chevron Phillips Chemical Company, The Woodlands, Tex.) was dissolved in 9 grams of ethyl acetate. Using a micropipettor, 50 microliters of a polymer solution was applied in 7 drops to a PMMA plate. The solution was immediately spread around on the plate using a finger cot. The ethyl acetate was allowed to evaporate for 5 minutes, thereby producing a film formed on the PMMA plate.

Figure 1:
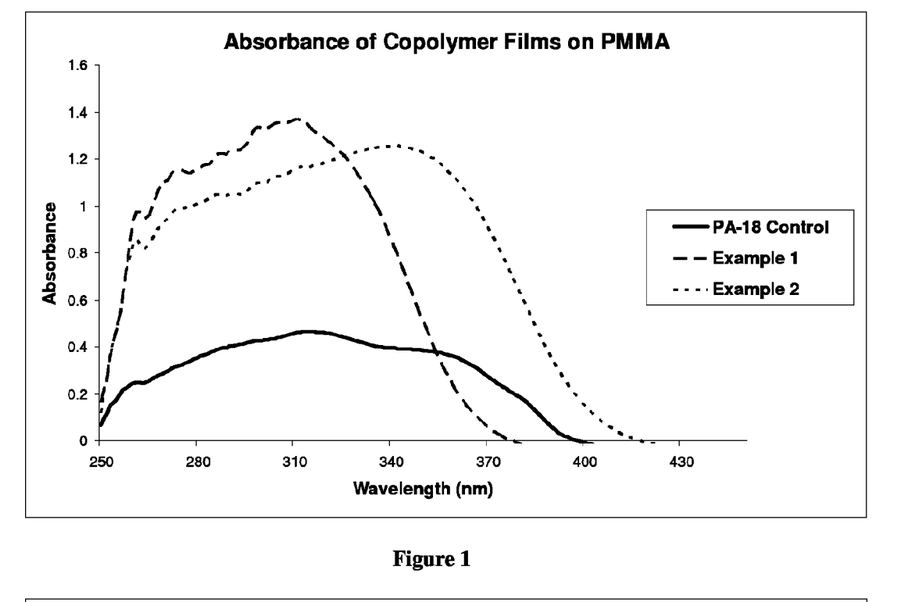
FIG. 1 is a graph of the absorbance of films prepared from crylene-containing copolymers, from a wavelength of 250 nm to 415 nm.

UV absorbance spectra were measured using the Labsphere UV-1000S UV Transmittance Analyzer (see FIG. 1). For each of the three samples, the sun protection factor (SPF), UVA transmittance (320 nm-400 nm), and UVB transmittance (290 nm-320 nm) were determined, as shown in Table 1.

TABLE 1

|  | SPF | Transmittance (UVA) | Transmittance (UVB) |
|---|---|---|---|
| PA-18 Control | 2.78 | 55.37% | 37.32% |
| Example 1 | 11.7 | 59.15% | 5.17% |
| Example 2 | 13.34 | 18.32% | 7.91% |

Both crylene-containing polymers (Example 1 and Example 2) showed improved UV-absorbing properties compared to the control copolymer formed from maleic anhydride and 1-octadecene (PA-18). For example, the polymers from Example 1 and Example 2 demonstrated increased SPF and decreased UVB transmittance, compared to the PA-18 control polymer. In addition, the film prepared from the polymer of Example 1 also demonstrated reduced UVA transmittance compared to the PA-18 control polymer.

Example 4

The following is a preparation for films containing octyl methoxycinnamate (also known as octinoxate), avobenzone, and the polymer described in Example 2. After forming the films on polymethylmethacrylate (PMMA) plates, the UV absorbance of the films before and after UV irradiation was measured. PMMA plates were used as substrates for the films due to the relatively high UV transparency of PMMA.

To prepare the films, 1 gram of the powdered polymer of Example 2, 0.3 grams avobenzone (NEO HELIOPAN 357, available from Symrise, Teterboro, N.J.), and 0.5 grams of octyl methoxycinnamate (ESCALOL 557, available from International Specialty Products, Wayne, N.J.) was dissolved in 8.2 grams of ethyl acetate. A film prepared from a polymer that did not contain crylene moieties served as a control. To prepare the control film, 1 gram of PA-18 copolymer (a copolymer of maleic anhydride and 1-octadecene, available from Chevron Phillips Chemical Company, The Woodlands, Tex.), 0.3 grams avobenzone (NEO HELIOPAN 357, available from Symrise, Teterboro, N.J.), and 0.5 grams of octyl methoxycinnamate (ESCALOL 557, available from International Specialty Products, Wayne, N.J.) was dissolved in 8.2 grams of ethyl acetate. Using a micropipettor, 50 microliters of a polymer solution was applied in 7 drops to a PMMA plate. The solution was immediately spread around on the plate using a finger cot. The ethyl acetate was allowed to evaporate for 5 minutes, thereby producing a film formed on the PMMA plate.

Figure 2:
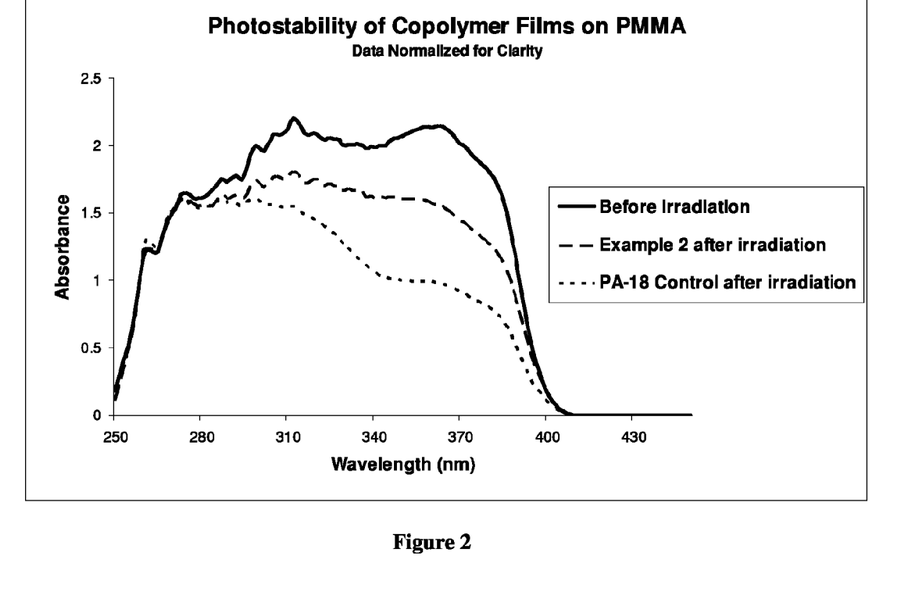
FIG. 2 is a graph of the original absorbance of a film prepared from crylene-containing copolymers and the absorbance of the film after the film has been exposed to 30 MED.

UV absorbance spectra were measured using the Labsphere UV-1000S UV Transmittance Analyzer (see FIG. 2). UV absorbance spectra were obtained for the crylene-containing polymer (Example 2) and the PA-18 control polymer both before and after irradiation with 30 MED (630 mJ/cm$^2$) UV radiation (290 nm-400 nm). Irradiation of the film was carried out using a Solar Light Co. Model 16S Solar Simulator equipped with a PMA2105 UV-B DCS Detector and a PMA2100 Controller. The absorbance spectrum of the crylene-containing polymer after irradiation represents normalized data to facilitate direct comparison of the changes in absorbance for the two polymers after irradiation.

For each of the two samples, the reduction in sun protection factor (SPF), the increase in UVA transmittance (320 nm-400 nm), and the increase in UVB transmittance (290 nm-320 nm) after irradiation were determined, as compared to the SPF, UVA transmittance, and UVB transmittance before irradiation, as shown in Table 2.

TABLE 2

|  | Reduction in SPF | Increase in Transmittance (UVA) | Increase in Transmittance (UVB) |
|---|---|---|---|
| PA-18 Control | 80.62% | 70.43% | 65.50% |
| Example 2 | 47.53% | 34.00% | 41.08% |

The crylene-containing polymer (Example 2) displayed improved UV photostabilizing properties after UV irradiation, as evidenced by comparison to the control copolymer formed from maleic anhydride and 1-octadecene (PA-18). For example, the polymer from Example 2 demonstrated a smaller reduction in SPF after UV irradiation compared to the PA-18 control polymer. In addition, the film prepared from the polymer of Example 2 also demonstrated a smaller increase in both UVA and UVB transmittance compared to the PA-18 control polymer.

What is claimed is:

1. A polymer comprising a monomer having a formula (I):

wherein:
R$^1$ and R$^2$ are each independently selected from the group consisting of C$_1$-C$_{50}$ alkyl, C$_2$-C$_{50}$ alkenyl, alkynyl, C$_3$-C$_8$ cycloalkyl, C$_2$-C$_{50}$ polyether, C$_2$-C$_{500}$ substituted polyether, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, halo, C(O)OR$^a$, OC(O)R$^a$, C(O)H, C(O)R$^a$, C(O)NR$^a$R$^b$, —C(O)SR$^a$, OR$^a$, —SR$^a$, NR$^a$R$^b$, —CN, and X is O, S, or NR$^c$;

W is —C(O)OR$^z$, —C(O)R$^z$—, —C(O)NR$^d$R$^z$—, —C(O)SR$^z$—, —SR$^z$—, —NR$^e$R$^z$—, or a bond;

n is 3 to 30;

k and m are each independently selected from 0 to 5;

R$^a$, R$^b$, R$^c$, R$^d$, and R$^e$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_1$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl; and

R$^z$ alkylene, C$_1$-C$_{50}$ alkenylene, C$_7$-C$_{50}$ alkynylene, cycloalkyl, C$_1$-C$_{50}$ substituted alkylene, C$_2$-C$_{50}$ substituted alkenylene, C$_2$-C$_{50}$ substituted alkynylene, C$_3$-C$_8$ substituted cycloalkyl, aryl, substituted aryl, heteroaryl, substituted heteroaryl, heterocycloalkyl, or substituted heterocycloalkyl;

with the proviso that when W is —C(O)OR$^z$—, n is 8 to 30.

2. A UV-absorbing composition comprising the polymer of claim a dibenzoylmethane derivative, and a cinnamate ester.

3. A method of preparing a UV-absorbing film comprising: providing a solution comprising the polymer of claim 1 and an organic solvent, applying the solution to a surface, and removing the solvent.

4. The method of claim 3, further comprising a monomer selected from the group consisting of a monomer having a formula (II), a monomer having a formula (III), a monomer having a formula (IIIA), a monomer having a formula (IV), a monomer having a formula (V), a monomer having a formula (VI), and combinations thereof:

(II)

(III)

(IIIA)

(IV)

(V)

(VI)

wherein:

R$^3$ and R$^5$ are each independently selected from the group consisting of: hydrogen, fluoride, chloride, iodide, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, and halo; and R$^4$ and R$^6$ are each independently selected from the group consisting of hydrogen, C$_1$-C$_{50}$ alkyl, C$_2$-C$_{50}$ alkenyl, C$_2$-C$_{50}$ alkynyl, C$_3$-C$_8$ cycloalkyl, C$_2$-C$_{50}$ polyether, C$_2$-C$_{50}$ substituted polyether, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, substituted heterocycloalkyl, halo, —C(O)OR$^x$, —OC(O)R$^x$, —C(O)H, —C(O)R$^x$, —C(O)NR$^x$R$^y$, —C(O)SR$^x$, —OR$^x$, —SR$^x$, —NR$^x$R$^y$, —CN, and —NO$_2$; or R$^4$ and R$^6$ taken together with the atoms to which they are bonded form a 5 to 7 membered heterocyclic ring or a substituted 5 to 7 membered heterocyclic ring;

R$^x$ and R$^y$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl;

X$^1$, X$^2$, X$^3$, X$^4$, and X$^5$ are each independently selected from the group consisting O, S, and NR$^f$; and R$^7$, R$^8$, R$^9$, R$^{10}$, R$^{11}$, R$^{12}$, and R$^f$ are each independently selected from the group consisting of: hydrogen, C$_1$-C$_{50}$ alkyl, C$_2$-C$_{50}$ alkenyl, C$_2$-C$_{50}$ alkynyl, C$_3$-C$_8$ cycloalkyl, C$_1$-C$_{50}$ substituted alkyl, C$_2$-C$_{50}$ substituted alkenyl, C$_2$-C$_{50}$ substituted alkynyl, C$_3$-C$_8$ substituted cycloalkyl, aryl, substituted aryl, heteroaryl, substituted heteroaryl, heterocycloalkyl, and substituted heterocycloalkyl, or R$^{10}$ and R$^f$ taken together with the atoms to which they are bonded form a 5 or 6 membered ring.

5. The method of claim 3, further comprising a monomer selected from the group consisting of maleic anhydride monomers, methyl methacrylate monomers, vinyl acetate monomers, C$_3$-C$_{38}$ alpha-olefin monomers, N-vinyl pyrrolidone monomers, styrene monomers, and combinations thereof.

6. The method of claim 3, wherein n is 8 to 13.

7. The method of claim 3, wherein X is 0.

8. The method of claim 3, wherein k and m are both 0.

9. The method of claim 3, wherein k is 1, m is 0, and R$^1$ is —OR$^a$; or k is 0, m is 1, and R$^2$ is —OR$^a$.

10. The method of claim 9, wherein R$^a$ is C$_1$-C$_3$ alkyl.

11. The method of claim 9, wherein R$^1$ is —OCH$_3$ or R$^2$ is —OCH$_3$.

12. The method of claim 3, wherein the monomer having a formula (I) is selected from the group consisting of a monomer having a formula (VIII) and a monomer having a formula (IX):

wherein:
k is 0 or 1; and
$R^1$ is —$OR^a$.

13. The method of claim 12, wherein $R^a$ is $C_1$-$C_3$ alkyl.

14. The method of claim 3, wherein the weight-average molecular weight of said polymer is in the range of about 1,000 to about 1,000,000.

15. A method of waterproofing a surface comprising: providing a solution comprising the polymer of claim 1 and an organic solvent, applying the solution to a surface, and removing the solvent.

16. The method of claim 15, further comprising a monomer selected from the group consisting of a monomer having a formula (II), a monomer having a formula (III), a monomer having a formula (IIIA), a monomer having a formula (IV), a monomer having a formula (V), a monomer having a formula (VI), and combinations thereof:

wherein:
$R^3$ and $R^5$ are each independently selected from the group consisting of: hydrogen, fluoride, chloride, iodide, $C_1$-$C_{50}$ alkyl, $C_2$-$C_{50}$ alkenyl, $C_2$-$C_{50}$ alkynyl, $C_3$-$C_8$ cycloalkyl, $C_1$-$C_{50}$ substituted alkyl, $C_2$-$C_{50}$ substituted alkenyl, $C_2$-$C_{50}$ substituted alkynyl, $C_3$-$C_8$ substituted cycloalkyl, aryl, substituted aryl, heteroaryl, substituted heteroaryl, heterocycloalkyl, substituted heterocycloalkyl, and halo; and $R^4$ and $R^6$ are each independently selected from the group consisting of hydrogen, $C_1$-$C_{50}$ alkyl, $C_2$-$C_{50}$ alkenyl, $C_2$-$C_{50}$ alkynyl, $C_3$-$C_8$ cycloalkyl, $C_2$-$C_{50}$ polyether, $C_2$-$C_{50}$ substituted polyether, $C_1$-$C_{50}$ substituted alkyl, $C_2$-$C_{50}$ substituted alkenyl, $C_2$-$C_{50}$ substituted alkynyl, $C_3$-$C_8$ substituted cycloalkyl, aryl, substituted aryl, heteroaryl, substituted heteroaryl, heterocycloalkyl, substituted heterocycloalkyl, halo, —$C(O)OR^x$, —$OC(O)R^x$, —$C(O)H$, —$C(O)R^x$, —$C(O)NR^xR^y$, —$C(O)SR^x$, —$OR^x$, —$SR^x$, —$NR^xR^y$, —$CN$, and —$NO_2$; or $R^4$ and $R^6$ taken together with the atoms to which they are bonded form a 5 to 7 membered heterocyclic ring or a substituted 5 to 7 membered heterocyclic ring;

$R^x$ and $R^y$ are each independently selected from the group consisting of: hydrogen, $C_1$-$C_{50}$ alkyl, $C_2$-$C_{50}$ alkenyl, $C_2$-$C_{50}$ alkynyl, $C_3$-$C_8$ cycloalkyl, $C_1$-$C_{50}$ substituted alkyl, $C_2$-$C_{50}$ substituted alkenyl, $C_2$-$C_{50}$ substituted alkynyl, $C_3$-$C_8$ substituted cycloalkyl, aryl, substituted aryl, heteroaryl, substituted heteroaryl, heterocycloalkyl, and substituted heterocycloalkyl;

$X^1$, $X^2$, $X^3$, $X^4$, and $X^5$ are each independently selected from the group consisting O, S, and $NR^f$; and $R^7$, $R^8$, $R^9$, $R^{10}$, $R^{11}$, $R^{12}$, and $R^f$ are each independently selected from the group consisting of: hydrogen, $C_1$-$C_{50}$ alkyl, $C_2$-$C_{50}$ alkenyl, $C_2$-$C_{50}$ alkynyl, $C_3$-$C_8$ cycloalkyl, $C_1$-$C_{50}$ substituted alkyl, $C_2$-$C_{50}$ substituted alkenyl, $C_2$-$C_{50}$ substituted alkynyl, $C_3$-$C_8$ substituted cycloalkyl, aryl, substituted aryl, heteroaryl, substituted heteroaryl, heterocycloalkyl, and substituted heterocycloalkyl, or $R^{10}$ and $R^f$ taken together with the atoms to which they are bonded form a 5 or 6 membered ring.

17. The method of claim 15, further comprising a monomer selected from the group consisting of maleic anhydride monomers, methyl methacrylate monomers, vinyl acetate monomers, $C_3$-$C_{38}$ alpha-olefin monomers, N-vinyl pyrrolidone monomers, styrene monomers, and combinations thereof.

18. The method of claim 15, wherein n is 8 to 13.

19. The method of claim 15, wherein X is O.

20. The method of claim 15, wherein k and m are both 0.

21. The method of claim 15, wherein k is 1, m is 0, and $R^1$ is —$OR^a$; or k is 0, m is 1, and $R^2$ is —$OR^a$.

22. The method of claim 21, wherein $R^a$ is $C_1$-$C_3$ alkyl.

23. The method of claim 21, wherein $R^1$ is —$OCH_3$ or $R^2$ is —$OCH_3$.

24. The method of claim 15, wherein the monomer having a formula (I) is selected from the group consisting of a monomer having a formula (VIII) and a monomer having a formula (IX):

(VIII)

(IX)

wherein:

k is 0 or 1; and $R^1$ is —$OR^a$.

25. The method of claim 24, wherein $R^a$ is $C_1$-$C_3$ alkyl.

26. The method of claim 15, wherein the weight-average molecular weight of said polymer is in the range of about 1,000 to about 1,000,000.

* * * * *